(12) United States Patent
Geltinger

(10) Patent No.: US 11,999,093 B2
(45) Date of Patent: Jun. 4, 2024

(54) APPARATUS AND METHOD FOR TREATING PLASTIC PREFORMS WITH INSPECTION DEVICE

(71) Applicant: KRONES AG, Neutraubling (DE)

(72) Inventor: Florian Geltinger, Donaustauf (DE)

(73) Assignee: KRONES AG (DE)

( * ) Notice: Subject to any disclaimer, the term of this patent is extended or adjusted under 35 U.S.C. 154(b) by 359 days.

(21) Appl. No.: 17/402,965

(22) Filed: Aug. 16, 2021

(65) Prior Publication Data
US 2022/0048236 A1    Feb. 17, 2022

(30) Foreign Application Priority Data
Aug. 14, 2020    (DE) .................... 10 2020 121 425.1

(51) Int. Cl.
| | |
|---|---|
| B29C 49/78 | (2006.01) |
| B29C 49/42 | (2006.01) |
| G01N 21/88 | (2006.01) |
| B29L 31/00 | (2006.01) |

(52) U.S. Cl.
CPC .......... *B29C 49/78* (2013.01); *B29C 49/4205* (2013.01); *G01N 21/8851* (2013.01); *B29L 2031/712* (2013.01); *G01N 2021/8887* (2013.01)

(58) Field of Classification Search
CPC ............... B29C 49/78; B29C 49/4205; G01N 21/8851; G01N 2021/8887; B29L 2031/712
USPC ........................................................ 209/577
See application file for complete search history.

(56) References Cited

U.S. PATENT DOCUMENTS

| | | | |
|---|---|---|---|
| 2018/0015657 A1 | 1/2018 | Linke et al. ........ | B29C 49/4205 |
| 2019/0071194 A1* | 3/2019 | Tanner .................... | B65G 15/08 |
| 2019/0217523 A1 | 7/2019 | Tanner .................... | B29C 49/42 |
| 2020/0180204 A1 | 6/2020 | Nebl et al. .............. | B29C 49/06 |

FOREIGN PATENT DOCUMENTS

| | | | | |
|---|---|---|---|---|
| CN | 102962980 A | * | 3/2013 | ............ B29C 49/06 |
| CN | 104416890 B | * | 10/2017 | ........... B07C 5/3404 |
| DE | 20308513 U1 | * | 8/2004 | ......... B29C 49/4205 |
| DE | 10 2017 112 455 | | 12/2018 | ............. B29C 49/64 |
| DE | 102017112455 A1 | * | 12/2018 | ............. B29C 49/06 |
| DE | 10 2018 122 548 | | 3/2020 | ............. B29C 48/78 |

(Continued)

OTHER PUBLICATIONS

Extended European Search Report issued in European Patent Appln. Serial No. 21 18 4743, dated Dec. 6, 2021, with machine English translation, 9 pages.

*Primary Examiner* — Terrell H Matthews
(74) *Attorney, Agent, or Firm* — HAYES SOLOWAY P.C.

(57) ABSTRACT

Apparatus for treating plastic preforms, having a reservoir which is configured for receiving a plurality of plastic preforms, having at least one first transport device which transports the plastic preforms out of the reservoir, and having a sorting device which is arranged down-stream of the first transport device in a transport direction of the plastic preforms, and having at least one further transport device which is arranged downstream of the sorting device in the transport direction, wherein the apparatus has an inspection device for inspecting the transported plastic performs, arranged between the reservoir and the sorting device.

20 Claims, 1 Drawing Sheet

(56) References Cited

FOREIGN PATENT DOCUMENTS

| | | | | |
|---|---|---|---|---|
| EP | 2112502 A1 | * | 10/2009 | ......... G01N 21/9072 |
| EP | 2112502 B1 | * | 2/2013 | ......... G01N 21/9072 |
| EP | 3 514 085 | | 7/2019 | ............. B65G 43/08 |
| EP | 3514085 A1 | * | 7/2019 | ........... B29C 31/008 |
| FR | 2556273 A1 | * | 12/1983 | |
| WO | WO-2016029997 A1 | * | 3/2016 | ............. B29C 49/06 |
| WO | WO-2017153060 A1 | * | 9/2017 | |

* cited by examiner

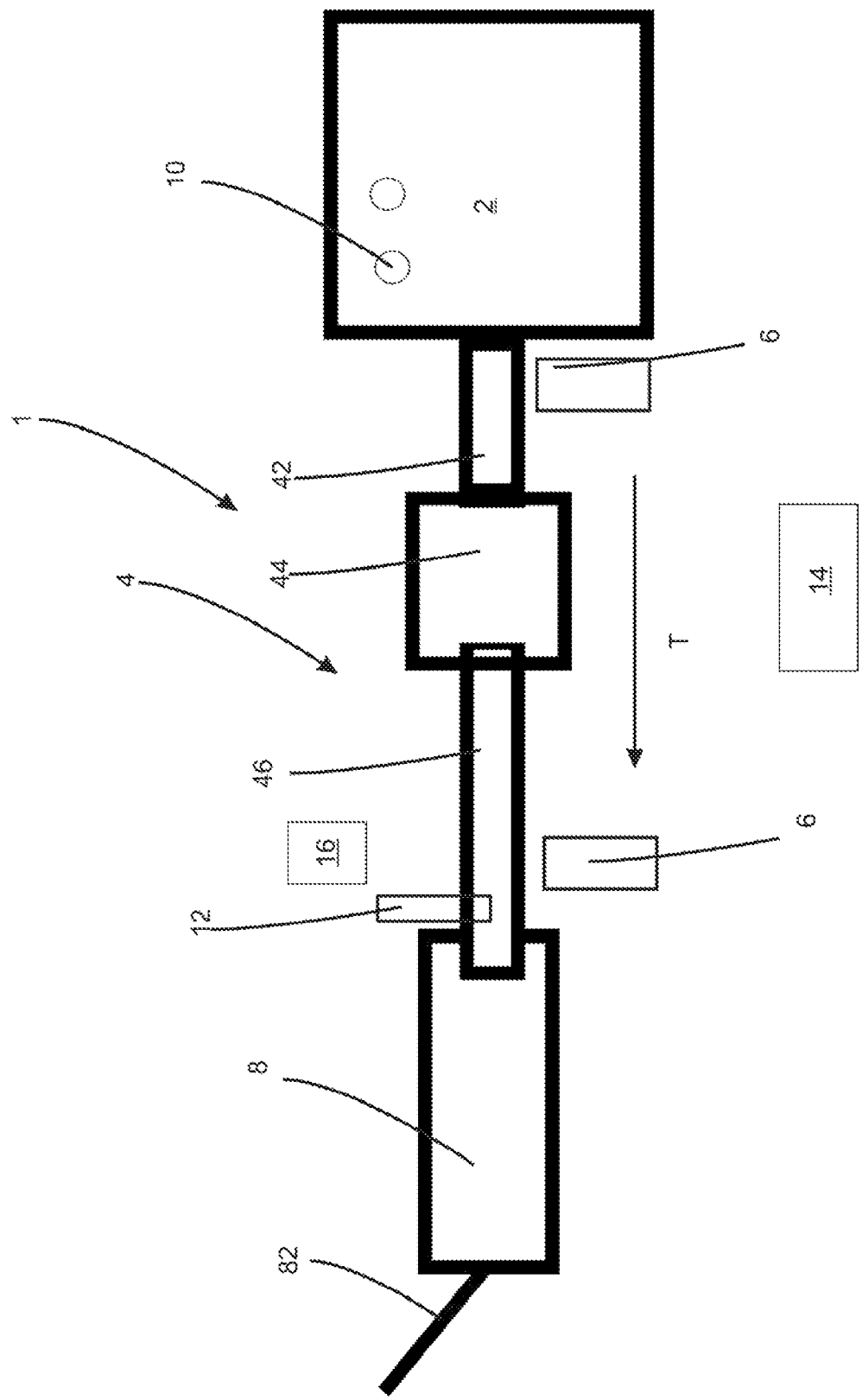

APPARATUS AND METHOD FOR TREATING PLASTIC PREFORMS WITH INSPECTION DEVICE

BACKGROUND OF THE INVENTION

The present invention relates to an apparatus and a method for treating plastic preforms. In the prior art, it has been known for a long time that plastic preforms are heated and then expanded into plastic containers, for example by means of a so-called stretch blow-moulding machine. It is known that plastic preforms are first produced, for example in an injection moulding machine, these are then sorted and in this sorted state are fed to a heating device and finally also to a blow moulding device.

It can always happen that such plastic preforms have deviating qualities or also show damage and for this reason are not suitable for further processing.

Therefore, inspection systems are known in the prior art which inspect the plastic preforms. It is known, for example, that such inspection systems are provided after an injection moulding machine. The disadvantage of this approach is that damage to the plastic preforms during transport, storage in a silo or insertion into a silo is not detected, as this silo is downstream of the injection moulding machine and also of the inspection.

It is also known that inspection systems are arranged in a run-off rail of a plastic preform. These systems have the disadvantage that the plastic preforms have to be separated in a time-consuming and failure-prone manner.

There are also inspection systems in the machine itself, for example in an oven, or in a separation device or after the oven. The disadvantage of this approach is that a gap is created by rejecting a plastic preform, which can no longer be closed.

The present invention therefore has the object of proposing an apparatus and a method in which the inspection is carried out in such a way that it has less influence on the overall han-dling of the plastic preforms than is usual in the state of the art.

SUMMARY OF THE INVENTION

An apparatus according to the invention for treating plastic preforms comprises a reservoir which is suitable and intended for receiving a plurality of plastic preforms. The apparatus further comprises at least one first transport device for transporting the plastic preforms from the reservoir and a sorting device arranged in a transport direction of the plastic preforms downstream of the first transport device, as well as at least one further transport device arranged in the transport direction downstream of the sorting device, wherein the apparatus comprises an inspection device for inspecting the transported plastic preforms.

According to the invention, this inspection device is arranged between the reservoir and the sorting device.

Thus, within the scope of the invention, in particular, the inspection technique or the inspection device is also proposed at a certain predetermined point of the installation.

By arranging the inspection device downstream of the reservoir, it is ensured that also such damages can be detected which result just by the storage in the reservoir, which can be a silo, for example. Furthermore, it is possible to carry out the inspection in an area in which the plastic preforms are separated (for example, as explained in more detail below, separated on a transport surface such as a conveyor belt). Nevertheless, even when a plastic preform is rejected, no gap has to be closed in the flow of containers, since they are not yet separated in a defined way, i.e. arranged separated in a row.

In another preferred embodiment, it is also possible that the device comprises a manufacturing device for producing plastic preforms, for example an injection moulding machine, which produces the plastic preforms and feeds them to the silo, for example. However, it is also possible that this production device is located at another place, and only plastic preforms that have already been produced are fed into the silo. In addition, it would also be conceivable that a manufacturing device is provided instead of the reservoir. The applicant reserves the right to claim protection for such an object as well.

Preferably, the transport device has a multi-stage design. In particular, the transport device has several successive transport units, which particularly preferably transport the plastic preforms in different ways.

In a preferred embodiment, the sorting device has a first rotatable roller and a second rotatable roller, wherein the two axes of rotation of these rollers being parallel to each other, and the plastic preforms can be guided between these rollers and, in particular, supported on their support rings. This sorting device simultaneously aligns the plastic preforms and transports them in a row. It is possible that the plastic preforms fall onto these rollers and are aligned by these rollers.

In a further preferred embodiment, the sorting device is directly or indirectly followed by a clocking-in device which separates the plastic preforms transported in a row and in particular abutting against each other, and in particular creates a constant pitch between the plastic preforms.

In a preferred embodiment, the inspection device is suitable and intended to carry out an inspection of the plastic preforms during their transport. This means that the plastic preforms are preferably inspected in motion.

In a further preferred embodiment, the apparatus has a heating device which connects in particular to the units described here and in particular also to the clocking-in device described, such as a clocking-in star.

In a preferred embodiment, the inspection device inspects the plastic preforms in a region of the transport path in which they are not separated and/or not transported in a defined position. However, it is particularly preferred that the plastic preforms are at least partially spaced apart in this area. In a preferred embodiment, the inspection device inspects the plastic preforms in a region of the transport path in which they are not transported in a row.

In a further preferred embodiment, the inspection device has at least one image recording device which records at least one image of the transported plastic preforms. It is possible that the inspection device takes images of the individual plastic preforms. However, it would also be possible for images of a plurality of plastic preforms to be captured. Preferably, the device also has an evaluation device which evaluates the images recorded by the image recording device and decides, in particular on the basis of the images, whether individual plastic preforms are damaged and/or must be ejected.

In a further preferred embodiment, the image recording device is arranged in such a way that it observes the plastic preforms at an angle of between 5° and 85° relative to the transport direction of the plastic preforms. In particular, it is possible that the plastic preforms are transported in a certain plane and the image recording device observes this plane at an oblique angle. This means that the image recording device preferably does not observe the plastic preforms perpendicularly with respect to the transport plane, but oblique to it.

Particularly preferred is an angle between this plane between 10° and 80°, preferably between 15° and 75°, preferably between 20° and 70° and particularly preferably between 25° and 65°.

As mentioned above, the device preferably has an evaluation device which evaluates the images recorded by the image recording device and draws conclusions about the condition of the plastic preforms on the basis of this evaluation.

Particularly preferably, the evaluation device uses artificial intelligence. It is thus possible that a plurality differential images are stored in a memory device, which show certain typical defects, such as defective mouths, defective support rings, defective base bodies of the plastic preforms and the like. In this way, a comparison of the recorded images with these reference images can lead to the conclusion that a certain defect is present. It is also possible for this evaluation device to be taught for a wide variety of defects and defect structures, for example by means of "deep learning". Furthermore, it is also possible that this evaluation device is designed to be self-learning, i.e. that the machine also detects further or additional defect types on the basis of rejected plastic preforms.

Deep learning is a machine learning method that uses artificial neural networks (ANN), in particular with numerous intermediate layers between the input layer and the output layer, and thus forms an extensive internal structure. This is a special method of information processing.

In a preferred embodiment, the evaluation device or image capture device inspects the plastic preforms for criteria selected from a group of criteria including contamination, a colour of the plastic preform, a length of the plastic preform, a length of an injection point, under-injections, an ovality, mouth surface defects and the like.

As mentioned above, the image capture device preferably captures a spatially resolved image of these plastic preforms. For example, the image capture device may be a camera.

In a further preferred embodiment, the apparatus has an ejection device which is suitable and intended for ejecting individual plastic preforms or groups of plastic preforms from the transport path. It is possible for this ejection device to be coupled to the evaluation device in order to eject specific plastic preforms from the transport path in this way.

In a further preferred embodiment, this ejection device is arranged upstream of the sorting device in the transport direction of the plastic preforms. In this way it can be achieved that no more defective plastic preforms are fed to the sorting device and in this way the operational safety of the sorting device, for example of a roller sorter, can also be increased.

In a further preferred embodiment, the inspection device is arranged in an area of the apparatus in which the plastic preforms are transported lying down. It is thus possible for the plastic preforms to be conveyed horizontally at least in sections, for example on a conveyor belt. The inspection device is preferably arranged in the area of this horizontal transport. In this area, inspection of the plastic preforms is possible in a particularly favourable manner.

In a particularly preferred embodiment, the first transport device has at least one first transport belt which transports the plastic preforms horizontally. A horizontal transport is understood to mean a transport in which plastic preforms are not aligned in a vertical direction, for example, in particular with their mouths pointing upwards.

Preferably, the transport device also has a second conveyor belt which conveys the plastic preforms horizontally. It is particularly preferred that these two conveyor belts are not arranged directly one after the other, but that a further conveyor device is provided between these conveyor belts, which conveys the plastic preforms. In particular, this further conveying device can change a transport height, i.e. a height of the plastic preforms above a floor. For example, this further conveying device can convey the plastic preforms from a higher height to a lower height.

In a further preferred embodiment, the inspection device or the image recording device is arranged immediately after the reservoir. In this area, a conveyor belt is particularly preferably provided, which conveys the plastic preforms. In a further advantageous embodiment, the image recording device and/or the inspection device is arranged—in particular directly—in front of the sorting device. In this case, it would also be possible for the image recording device to be directly connected to the ejection device.

Both designs have the advantage that an already existing machine periphery can be used to arrange the inspection device and no further working space has to be created for this. In this way, the investment costs for such inspection equipment can be reduced. Also, there are no gaps in the line because, as mentioned above, the inspection takes place before the plastic preforms are separated. In a further advantageous embodiment, the inspection device is therefore arranged, as mentioned, in such a way that the plastic preforms are inspected during their transport on one of the conveyor belts.

The inspection device can also have several image recording devices which observe the transported plastic preforms.

The present invention is further directed to a method for treating plastic preforms, wherein a plurality of plastic preforms is received in a reservoir and plastic preforms are transported away from the reservoir by at least one first transport device. Furthermore, the plastic preforms are sorted by a sorting device, which is arranged downstream of the first transport device in a transport direction of the plastic preforms, and are transported further by at least one further transport device, which is arranged downstream of the sorting device in the transport direction, wherein an inspection device inspects the transported plastic preforms.

According to the invention, this inspection device is arranged between the reservoir and the sorting device and/or the inspection device carries out this inspection between the reservoir and the sorting device.

Particularly preferably, the inspection device takes images and, in particular, spatially resolved images of the plastic preforms. In a further preferred embodiment, these spatially resolved images are evaluated and a decision is made on the basis of the evaluation as to whether the plastic preforms are defect-free or defective.

In a further preferred method, defective plastic preforms are discharged from the transport path of the plastic preforms. This means that plastic preforms identified as good parts are transported further and ultimately processed into containers, whereupon plastic preforms identified as defective are ejected from the transport path. Particularly preferably, this ejection takes place before the plastic preforms are sorted.

BRIEF DESCRIPTION OF THE DRAWINGS

Further advantages and embodiments can be seen in the attached drawing. Therein shows:

FIG. 1 a schematic representation of an apparatus according to the invention.

DETAILED DESCRIPTION OF THE INVENTION

FIG. 1 shows a schematic representation of an apparatus 1 according to the invention. This has a reservoir 2 in which a plurality of plastic preforms 10 (only shown schematically) are arranged. Connected to this reservoir 2 is a transport device designated in its entirety as 4. A manufacturing device (not shown) for producing the plastic preforms, such as an injection moulding machine, can be provided upstream of this reservoir 2.

This transport device 4 preferably has a first conveyor belt 42, which is designed as a silo belt, for example. A conveyor device or a transport unit 44 is connected to this first conveyor belt 42, which in particular transports the plastic preforms to other heights, in particular downwards. The transport unit 44 can be an elevator.

This transport unit 44 is followed by a further transport belt 46, which is designed here in the form of intermediate belts.

The reference sign 8 indicates a sorting device which sorts the plastic preforms, wherein, as mentioned above, this sorting device 8 can have rotatable rollers extending in the transport direction of the plastic preforms. This sorting device 8 is adjoined by a further transport device in the form of a transport rail 82, in which the plastic preforms are preferably already transported in a row. A clocking-in star (not shown) can be connected to this transport rail, which separates the plastic preforms or divides them.

The reference signs 6 refer to possible (and in particular alternative) arrangements of the inspection devices. It can be seen that this is arranged either in the area of the first conveyor belt 42 or the second conveyor belt 46.

The reference sign 12 indicates an ejection device which serves to eject plastic preforms detected as defective from the transport path T.

The reference sign 14 indicates an evaluation device which evaluates the images recorded by the inspection device 6 and then decides which plastic preforms are to be regarded as defective. This evaluation device 14 in turn controls a control device 16 which controls the ejection device 12. In this way, it is possible for individual plastic preforms to be ejected from the transport path—but before the sorting device 8.

The applicant reserves the right to claim all features disclosed in the application documents as essential to the invention, provided they are individually or in combination new compared to the prior art. It is further pointed out that the individual figures also describe features which may be advantageous in themselves. The skilled person immediately recognises that a certain feature described in a figure can also be advantageous without adopting further features from this figure. Furthermore, the skilled person recognises that advantages can also result from a combination of several features shown in individual figures or in different figures.

LIST OF REFERENCE SIGNS 1 apparatus
2 reservoir
4 transport device
6 inspection devices
8 sorting device
12 ejection device
14 evaluation device
16 control device
16 control device
42 first transport belt
44 transport unit
46 second transport belt
82 transport rail
T transport path

The invention claimed is:

1. An apparatus for treating plastic preforms, having a reservoir which is configured for receiving a plurality of plastic preforms, having at least one first transport device which transports the plastic preforms out of the reservoir, and having a sorting device which is arranged downstream of the first transport device in a transport direction of the plastic preforms, wherein the sorting device has a first rotatable roller and a second rotatable roller, wherein the two axes of rotation of these rollers being parallel to each other, and the plastic preforms can be guided between these rollers wherein the sorting device simultaneously aligns the plastic preforms and transports them in a row and having at least one further transport device comprising a transport rail which is arranged downstream of the sorting device in the transport direction wherein the apparatus has an inspection device for inspecting the transported plastic preforms, wherein the inspection device is arranged between the reservoir and the sorting device.

2. The apparatus according to claim 1, wherein the inspection device is configured to inspect the plastic preforms in a region of the transport path in which they are not separated and/or are not transported in a defined position.

3. The apparatus according to claim 1, wherein, the inspection device has an image recording device configured to record at least one image of the transported plastic preforms.

4. The apparatus according to claim 3, wherein, the image recording device is arranged to observe the plastic preforms at an angle which is between 5° and 85° with respect to the transport direction of the plastic preforms.

5. The apparatus according to claim 3, wherein, the apparatus has an evaluation device configured to evaluate the images recorded by the image recording device and, on the basis of this evaluation, decide as to a state of the plastic preforms.

6. The apparatus according to claim 1, wherein, the apparatus has an ejection device which is configured for discharging individual plastic preforms from the transport path.

7. The apparatus according to claim 6, wherein, the ejection device is arranged upstream of the sorting device in the transport direction.

8. The apparatus according to claim 1, wherein the first transport device comprises at least a first transport belt configured to transport the plastic preforms horizontally.

9. The apparatus according to claim 8, wherein the inspection device is configured to inspect the plastic preforms during their transport with the conveyor belt.

10. A method for treating plastic preforms, wherein a plurality of plastic preforms is received in a reservoir and plastic preforms are transported away from the reservoir by at least one first transport device, and with a sorting device which is arranged downstream of the first transport device in a transport direction of the plastic preforms, wherein the sorting device has a first rotatable roller and a second rotatable roller, wherein the two axes of rotation of these rollers being parallel to each other, and the plastic preforms are guided between these rollers wherein the sorting device comprising a transport rail simultaneously aligns the plastic preforms and transports them in a row and are transported further by at least one further transport device comprising a transport rail which is arranged downstream of the sorting device in the transport direction, wherein an inspection device inspecting the transported plastic preforms,
wherein
the inspection device is arranged between the reservoir and the sorting device.

11. The apparatus according to claim 2, wherein, the inspection device has an image recording device configured to record at least one image of the transported plastic preforms.

12. The apparatus according to claim 2, wherein, the image recording device is arranged to observe the plastic preforms at an angle which is between 5° and 85° with respect to the transport direction of the plastic preforms.

13. The apparatus according to claim 4, wherein, the apparatus has an evaluation device configured to evaluate the images recorded by the image recording device and, on the basis of this evaluation, decide as to a state of the plastic preforms.

14. The apparatus according to claim 2, wherein, the apparatus has an ejection device which is configured for discharging individual plastic preforms from the transport path.

15. The apparatus according to claim 2, wherein, the ejection device is arranged upstream of the sorting device in the transport direction.

16. The apparatus according to claim 2, wherein the first transport device comprises at least a first transport belt configured to transport the plastic preforms horizontally.

17. The apparatus according to claim 16, wherein the inspection device is configured to inspect the plastic preforms during their transport with the conveyor belt.

18. The apparatus according to claim 3, wherein, the image recording device is arranged to observe the plastic preforms at an angle which is between 5° and 85° with respect to the transport direction of the plastic preforms.

19. The apparatus according to claim 18, wherein, the apparatus has an evaluation device configured to evaluate the images recorded by the image recording device and, on the basis of this evaluation, decide as to a state of the plastic preforms.

20. The apparatus according to claim 19, wherein, the apparatus has an ejection device which is configured for discharging individual plastic preforms from the transport path.

\* \* \* \* \*

UNITED STATES PATENT AND TRADEMARK OFFICE
CERTIFICATE OF CORRECTION

| | |
|---|---|
| PATENT NO. | : 11,999,093 B2 |
| APPLICATION NO. | : 17/402965 |
| DATED | : June 4, 2024 |
| INVENTOR(S) | : Geltinger |

Page 1 of 1

It is certified that error appears in the above-identified patent and that said Letters Patent is hereby corrected as shown below:

In the Claims

Claim 10, bridging Column 6, Line 67 to Column 7, Lines 1, "wherein the sorting device comprising a transport rail simultaneously aligns" should be --wherein the sorting device simultaneously aligns--.

Signed and Sealed this
Fourteenth Day of October, 2025

John A. Squires
*Director of the United States Patent and Trademark Office*